United States Patent
Shimano et al.

(10) Patent No.: US 6,912,527 B2
(45) Date of Patent: Jun. 28, 2005

(54) DATA CLASSIFYING APPARATUS AND MATERIAL RECOGNIZING APPARATUS

(75) Inventors: Mihoko Shimano, Tokyo (JP); Kenji Nagao, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 439 days.

(21) Appl. No.: 10/059,143

(22) Filed: Jan. 31, 2002

(65) Prior Publication Data

US 2002/0143761 A1 Oct. 3, 2002

(30) Foreign Application Priority Data

Feb. 2, 2001 (JP) ........................................ 2001-026439
Jan. 22, 2002 (JP) ........................................ 2002-013337

(51) Int. Cl.[7] .............................................. G06F 17/30
(52) U.S. Cl. ........................................ 707/7; 707/102
(58) Field of Search .................... 707/1–10, 100–104.1, 707/200–205; 705/10

(56) References Cited

U.S. PATENT DOCUMENTS 5,960,407 A * 9/1999 Vivona ........................ 705/10

2002/0016786 A1 * 2/2002 Pitkow et al. ................ 707/3

FOREIGN PATENT DOCUMENTS

JP   6-111021   4/1994

OTHER PUBLICATIONS

English Language Abstract of JP6–111021.
Fisher, "The Use of Multiple Measurements in Taxonomic Problems", Ann. Eugenics, 7, Part II, 1936, pp. 179–188.
Mori et al., "Pattern Recognition", IEICE, 1993, with an English language translation of the relevant portions.

* cited by examiner

*Primary Examiner*—Mohammad Ali
(74) *Attorney, Agent, or Firm*—Greenblum & Bernstein, P.L.C.

(57) ABSTRACT

In the present invention, model data groups each comprised of a plurality of items of model data are classified according to predetermined item and are thereby classified into classes each having a smaller distribution than a category that an application requires, a representative value of each class is compared with input data, a class with the representative value having a highest degree of similarity with the input data is determine, a category to which the class belongs is obtained, and thus the category to which the input data belongs is determined.

16 Claims, 19 Drawing Sheets

115

| CATEGORY | MODEL DATA |
|---|---|
| A | IMAGE a1, IMAGE a2 ········ |
| B | IMAGE b1, IMAGE b2 ········ |
| C | IMAGE c1, IMAGE c2 ········ |
| ⋮ | ⋮ |

| CLASS 501 | CATEGORY 401 | ITEM 502 | | MODEL DATA 402 | REPRESENTATIVE VALUE 503 |
|---|---|---|---|---|---|
| | | SHAPE 502a | SIZE 502b | | |
| 1 | A | a | s | IMAGE a1, IMAGE a2 | ........ |
| 2 | A | a | t | IMAGE a3, ........ | ........ |
| 3 | A | a | u | IMAGE a4, ........ | ........ |
| 4 | A | b | s | IMAGE a5, ........ | ........ |
| 5 | A | b | t | IMAGE a6, ........ | ........ |
| 6 | A | b | u | IMAGE a7, ........ | ........ |
| 7 | B | a | s | IMAGE b1, ........ | ........ |
| 8 | B | a | t | IMAGE b2, ........ | ........ |
| 9 | B | a | u | IMAGE b3, ........ | ........ |
| 10 | B | b | s | IMAGE b4, ........ | ........ |
| ........ | ........ | ........ | ........ | ........ | ........ |

1003

| CLASS (501) | MODEL CHARACTERISTIC VECTOR (1201) | REPRESENTATIVE VALUE (1202) |
|---|---|---|
| 1 | ○○○, ×××, △△△ | □□□ |
| 2 | ○×△  ×○△  △○× | ××× |
| ⋮ | ⋮ | ⋮ |

FIG. 12

DATA CLASSIFYING APPARATUS AND MATERIAL RECOGNIZING APPARATUS

BACKGROUND OF THE INVENTION

1. Field of the Invention

The present invention relates to a material recognizing apparatus provided with a data classifying apparatus that classifies input data into categories.

2. Description of the Related Art

Conventionally there is a data classifying apparatus that classifies input data into categories that an application requires. The conventional data classifying apparatus first obtains a vector of the input data and a representative vector of each category in classifying the input data into a corresponding category. The representative vector of a category is a barycentric vector of vectors of all model data contained in the category.

Next, the conventional data classifying apparatus compares the vector of the input data with the representative vector of the category, and detects a category having the representative vector having the highest degree of similarity with the vector of the input data. Then, the conventional data classifying apparatus classifies the input data into the category with the representative vector having the highest degree of similarity.

However, there is a case where the representative vector of a category does not indicate an accurate vector distribution. For example, as illustrated in FIG. 19, a category A has a wide distribution with an empty space in the center portion, while a category B has a small distribution disposed around the center portion of the category A. In this case, a position of the representative vector of the category A is point a, the representative vector of the category B is point b, and thereby the respective positions of the representative vectors become very close. When input data represented by a vector of point c is input, the input data is determined to have a high degree of similarity with the representative vector of the category A, and thereby is classified into the category A. However, taking account of respective distributions of categories A and B, the input data actually has a high degree of similarity with the category B, and should be classified into the category B.

Thus, in the conventional data classifying apparatus, there occurs a case that input data is not classified into a proper category.

SUMMARY OF THE INVENTION

The present invention has been carried out in view of the foregoing, and it is an object of the present invention to classify input data into a proper category regardless of distribution of category.

In order to achieve the object, in the present invention, model data groups each comprised of a plurality of items of model data are classified according to predetermined item and are thereby classified into classes each having a smaller distribution than a category that an application requires, a representative value of each of the classes is compared with input data, a class with the representative value having the highest degree of similarity with the input data is determined, and a category to which the determined class belongs is obtained as a category of the input data.

Thus, comparing the input data with a class obtains a category to which the input data belongs. As a result, regardless of size of distribution of category, since it is possible to classify the input data into a proper category, it is possible to increase accuracy in data classification and to perform practical data classification.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3 is a diagram illustrating a structure of a category-structure model data database according to the first embodiment;

FIG. 4 is a diagram illustrating a structure of a class-structure model data database according to the first embodiment;

FIG. 12 is a structure diagram of a model characteristic vector data database according to the second embodiment;

DETAILED DESCRIPTION OF THE PREFERRED EMBODIMENTS (First Embodiment)

Figure 1:
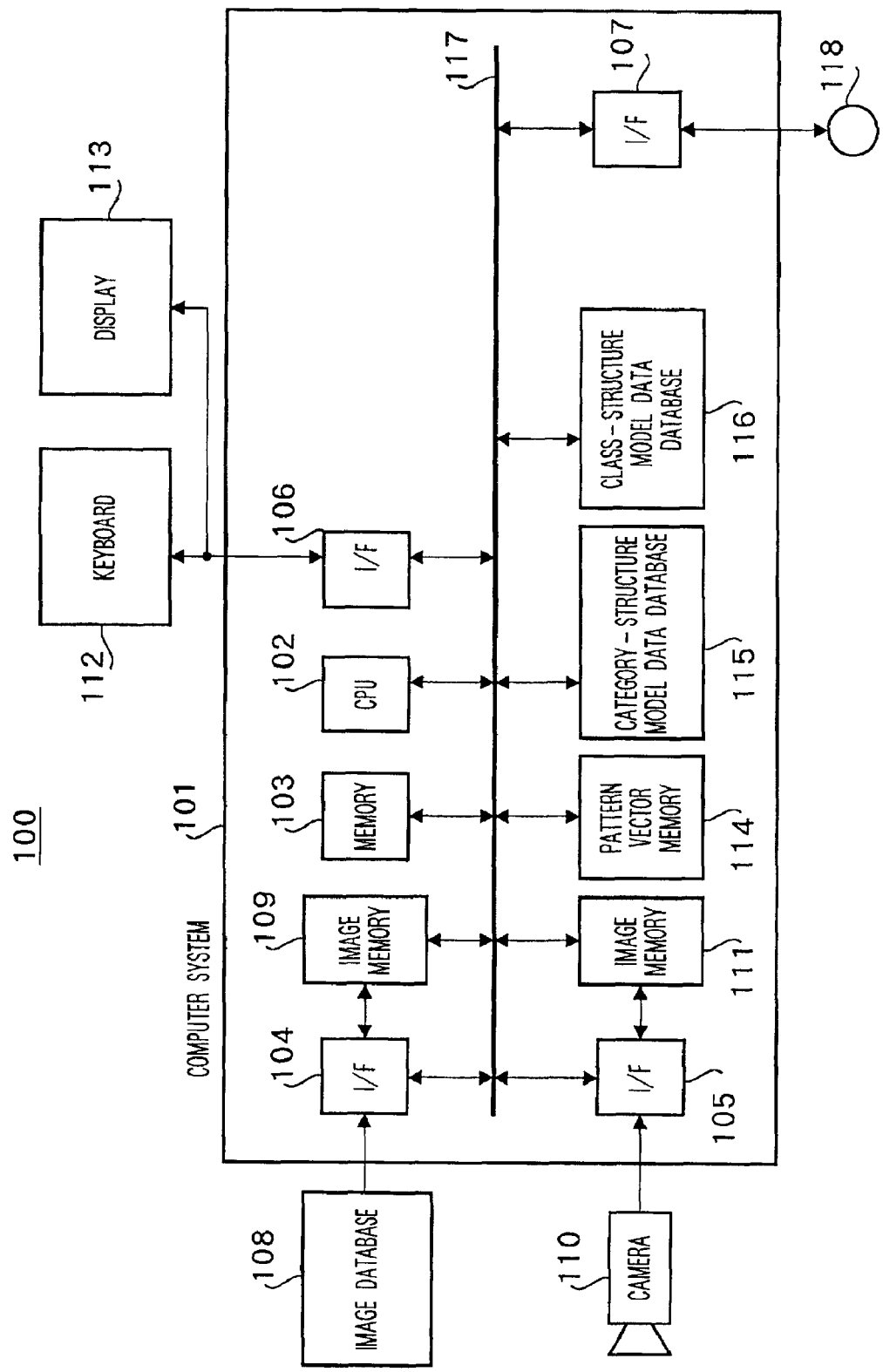
FIG. 1 is a block diagram of a data classifying apparatus according to a first embodiment of the present invention.

A data classifying apparatus according to the first embodiment of the present invention will be described below with reference to accompanying drawings. A configuration of the data classifying apparatus in the first embodiment will be described first with reference to FIG. 1. FIG. 1 is a block diagram of the data classifying apparatus according to the first embodiment.

Data classifying apparatus 100 according to the first embodiment adopts a configuration primarily including computer system 101.

Computer system 101 is provided with CPU 102 that executes the predetermined processing based on a program. The program is stored in memory 103. Memory 103 is also used for work of CPU 102.

Computer system 101 is further provided with interface units (hereinafter referred to as I/F) 104 to 107 that communicate data with an outside.

I/F 104 is controlled by CPU 102, receives image data transmitted from large-scale image database 108, provided in the outside, which stores the image data, and stores the data in image memory 109. Image database 108 is stored in a secondary storage device, optomagnetic disk or the like. I/F 104 also reads data stored in image memory 109.

I/F 105 is controlled by CPU 102, receives image data transmitted from video camera (hereinafter referred to as camera) 110 for shooting an image of a material, and stores the data in image memory 111. I/F 105 also reads data stored in image memory 111.

I/F 106 outputs information input from keyboard 112 as an input means to CPU 102 or the like. I/F 106 also transmits display data to display 113 as a display means.

I/F 107 transmits a result of classification by data classifying apparatus 100 on image data input from camera 110 to output terminal 118. The processing for classifying input image data will be described later.

Computer system 101 is further provided with pattern vector memory 114 for storing pattern vectors each expressed in one dimensional vector representative of pixel values of image data stored in image memories 109 and 111. CPU 102 executes the processing for transforming image data into a pattern vector.

Computer system 101 is furthermore provided with category-structure model data database 115 for storing model pattern vectors obtained by transforming image data (hereinafter referred to as model data) as various models input from image database 108 into pattern vectors. The pattern vectors stored in category-structure model data database 115 are classified and stored for each category.

Computer system 101 is moreover provided with class-structure model data database 116 for storing the category-structure model data, stored in category-structure model data database 115, classified for each class having a smaller distribution than a category. CPU 102 executes the processing for reconstructing the model data from the category structure to the model structure.

Each section in computer system 101 is connected with bus 117, and communicates information via bus 117.

Data classifying apparatus 100 configured as described above performs data classification by determining a class, among classes registered with class-structure model data database 116, to which image data (hereinafter referred to as input image data) input from camera 110 is most similar. Data classification processing in data classifying apparatus 100 primarily includes offline processing for constructing class-structure model data database 116 from category-basis-classified category-structure model data database 115, and online processing for performing class determination for determining a class of class-structure model data database 116 to which the input image data is most similar.

Figure 2:
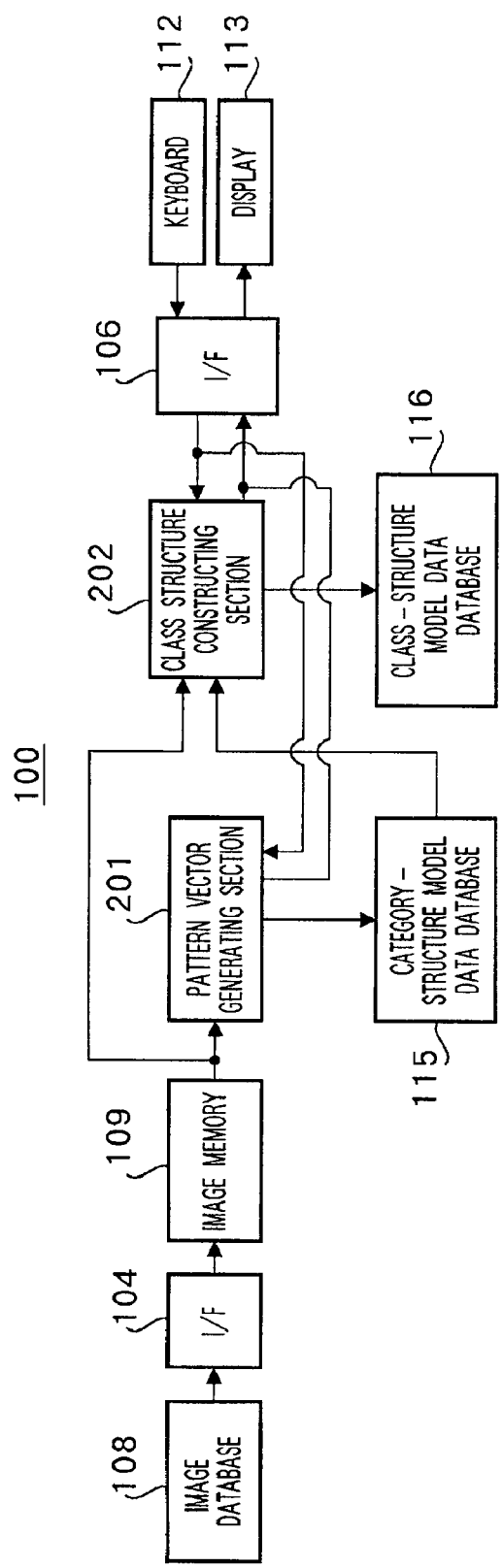
FIG. 2 is a functional block diagram for offline processing in the data classifying apparatus according to the first embodiment.

The offline processing of data classifying apparatus 100 will be described below. It is an object of the offline processing to construct class-structure model data database 116 from category-structure model data database 115. The offline processing is a feature of the present invention. A configuration for performing the offline processing of data classifying apparatus 100 will be described first with reference FIG. 2. FIG. 2 is a functional block diagram for the offline processing in the data classifying apparatus according to the first embodiment. In addition, the same sections as described above are assigned the same reference numerals.

Image database 108 stores a plurality of items of model data. The model data is stored in image memory 109 via I/F 104.

Data classifying apparatus 100 is provided with pattern vector generating section 201 that generates a model pattern from the model data stored in image memory 109, and further generates a pattern vector from the model pattern. The model pattern is a partial image of rectangle arbitrarily extracted from the model data. The pattern vector is a vector expressed in one dimensional vector representative of pixel values of the model pattern. In addition, the model pattern is not limited in size and shape. Further, the pattern vector may include a vector of an edge image, a one dimensional vector representative of coordinate information of a binary image.

Pattern vector generating section 201 displays a model pattern (or model data) corresponding to the generated pattern vector on display 113. Then, the section 201 obtains category information corresponding to the model pattern. The category information is input from keyboard 112 by a user seeing the displayed model pattern. The section 201 stores in category-structure model data database 115 generated pattern vectors classified for each category input from the user. The category information input from a user is category information that an application of data classifying apparatus 100 requires.

When pattern vector generating section 201 stores the generated pattern vectors of model data in category-structure model data database 115, the section 201 attaches a label with a classified category name to each pattern vector. The label is information representative of a type, category and the like of the model pattern.

A structure of category-structure model data database 115 will be described with reference to FIG. 3. FIG. 3 is a diagram illustrating a structure of the category-structure model data database according to the first embodiment.

As can be seen from FIG. 3, category-structure model data database 115 stores a plurality of pairs of category 402 that an application requires and model data corresponding to category 401. In addition, the model data stored in category-structure model data database 115 is in the form of a pattern vector.

As categories that the application requires, various categories are considered such as categories indicative of people such as "Mr.A", "Mr.B" and "Mr.C", categories indicative of types of vehicles such as "sedan", "track" and "RV", information indicative of a distance to a material. The model data corresponding to category 401 is attached a label with a name of category 401. In an example of FIG. 3, images a1 and a2 are each attached a label with "A", images b1 and b2 are each attached a label with "B", and images c1 and c2 are each attached a label with "C".

Data classifying apparatus 100 is further provided with class structure constructing section 202 that reconstructs model data stored for each category in category-structure model data database 115 into the class structure facilitating the classification of data classifying apparatus 100. Class structure constructing section 202 extracts a pattern vector from category-structure model data database 115, and transforms the pattern vector into a model pattern to transmit to display 113 via I/F 106, and thereby the data is displayed. Then, class structure constructing section 202 obtains type information of the model pattern corresponding to a predetermined item via I/F 106. The information is input from keyboard 112 by a user seeing the model pattern displayed on display 113. Class structure constructing section 202 stores in class-structure model data database 116 pattern vectors of category-structure model data database 115 which have been constructed in the class structure according to the type information of the model pattern.

The predetermined item is criterion information for classifying model data (model pattern) into classes. This embodiment enables the apparatus to arbitrarily have a plurality of hierarchical items for use in classification, according to classifying object that the application requires. Specific examples of items include a size of model pattern, edge amount of an edge image of model pattern, average gray-scale level (white-gray-black, or color) of model pattern, type of model pattern, shape of model pattern, type of shooting camera, color of model pattern, distance between model data and a camera, period when model data is shot, a facial direction, facial expressions, facial color and hair style when model data is data of a human face, type of light source used in shooting model data, direction of light source used in shooting model data, and size in an image.

The type information input from keyboard 112 by a user is information for classifying model data (model pattern) according to item. Examples of input type information include size information such as "large", "medium" and "small" when an item for classifying model patterns to be classified is of a size of a pattern of model data, edge amount information when such an item is of an edge amount of an edge image of model data, average gray-scale level information when such an item is of average gray-scale level (white-gray-black, or color) of model data, human name and vehicle name when such an item is of type of model data, and shape information indicative of a specific shape when such an item is of a shape.

Class structure constructing section 202 stores, in class-structure model data database 116, a value of a barycenter of pattern vectors of model data contained in each class as a representative vector. In addition, the representative value for each class is only required to have a value representing characteristics of model data, such as an average value of pattern vectors of model data.

Further, class structure constructing section 202 attaches to model data a label with a class to which the model data is classified to store in class-structure model data database 116. The class label describes information (class number and class name) for identifying a class to which the model data belongs and a type of an item of the class. In addition, the class label may describe only information for identifying a class to which the data belongs, such as the class number.

A structure of class-structure model data database 116 will be described next with reference to FIG. 4. FIG. 4 is a diagram illustrating a structure of the class-structure model data database according to the first embodiment.

As can be seen from FIG. 4, class-structure model data database 116 stores a plurality of sets of class number 501 indicative of a type of class, category 401 corresponding to the class, item 502 corresponding to the class, model data 402 classified into the class, and representative value 503 of the class. In an example of FIG. 4, shape 502a and size 502b are set as item 502. Each class is labeled with class number 501 and class item 502. The model data is stored in the form of a pattern vector.

Figure 5:
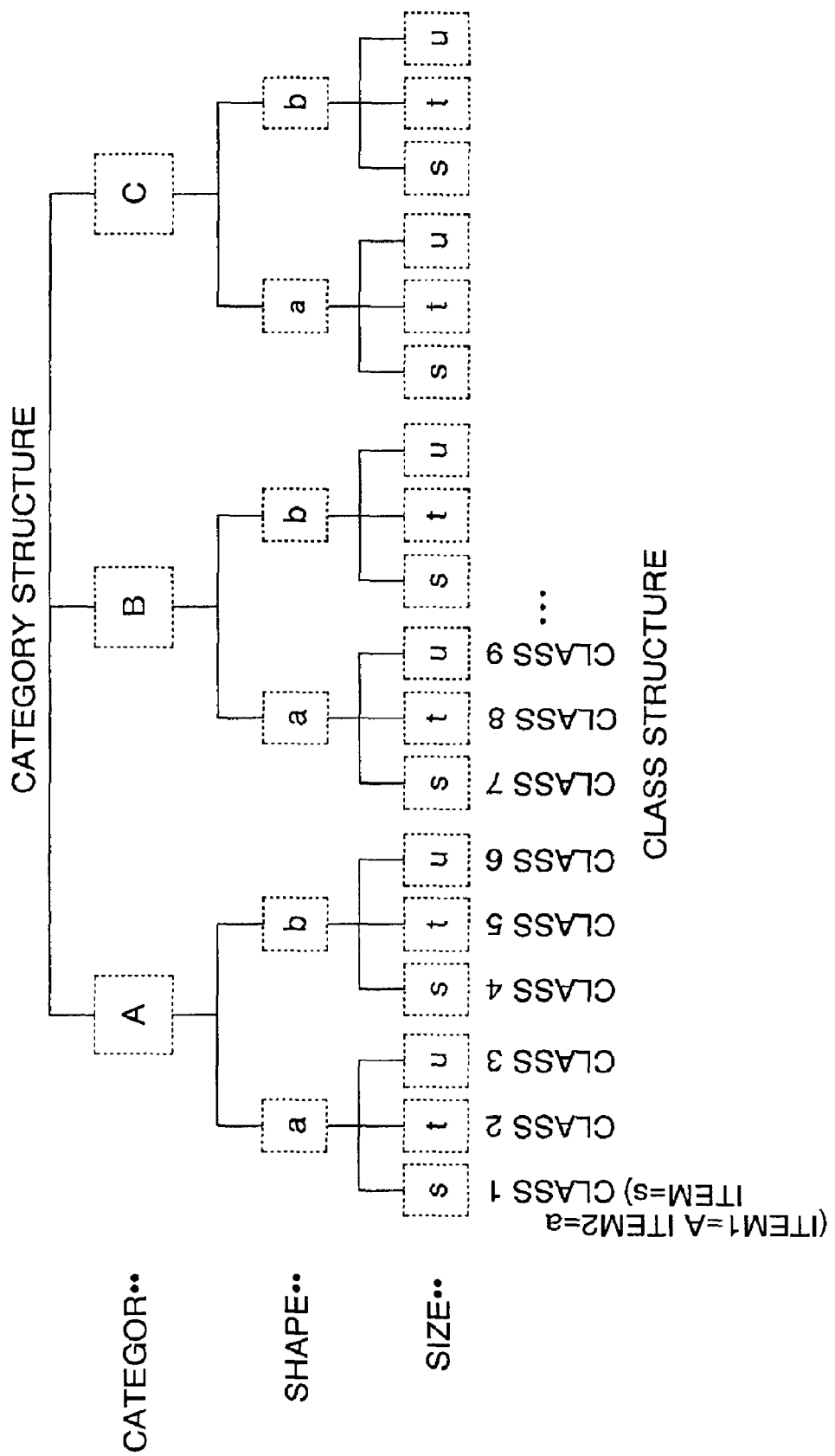
FIG. 5 is a diagram to explain the relationship between a category structure and a class structure.

With reference to FIG. 5, the relationship between the category structure and class structure will be described next. FIG. 5 is a diagram to explain the relationship between the category structure and class structure.

In an example of FIG. 5, an item of the highest-level of the hierarchy is of a shape, and an item of the lowest-level of the hierarchy is of a size. Then, as can be seen from the figure, the model data items are classified according to category, further classified according to item of shape, and then classified according to item of size.

In this embodiment, pattern vector generating section 201 and class structure constructing section 202 are achieved by CPU 102 reading the program stored in memory 103.

Figure 6:
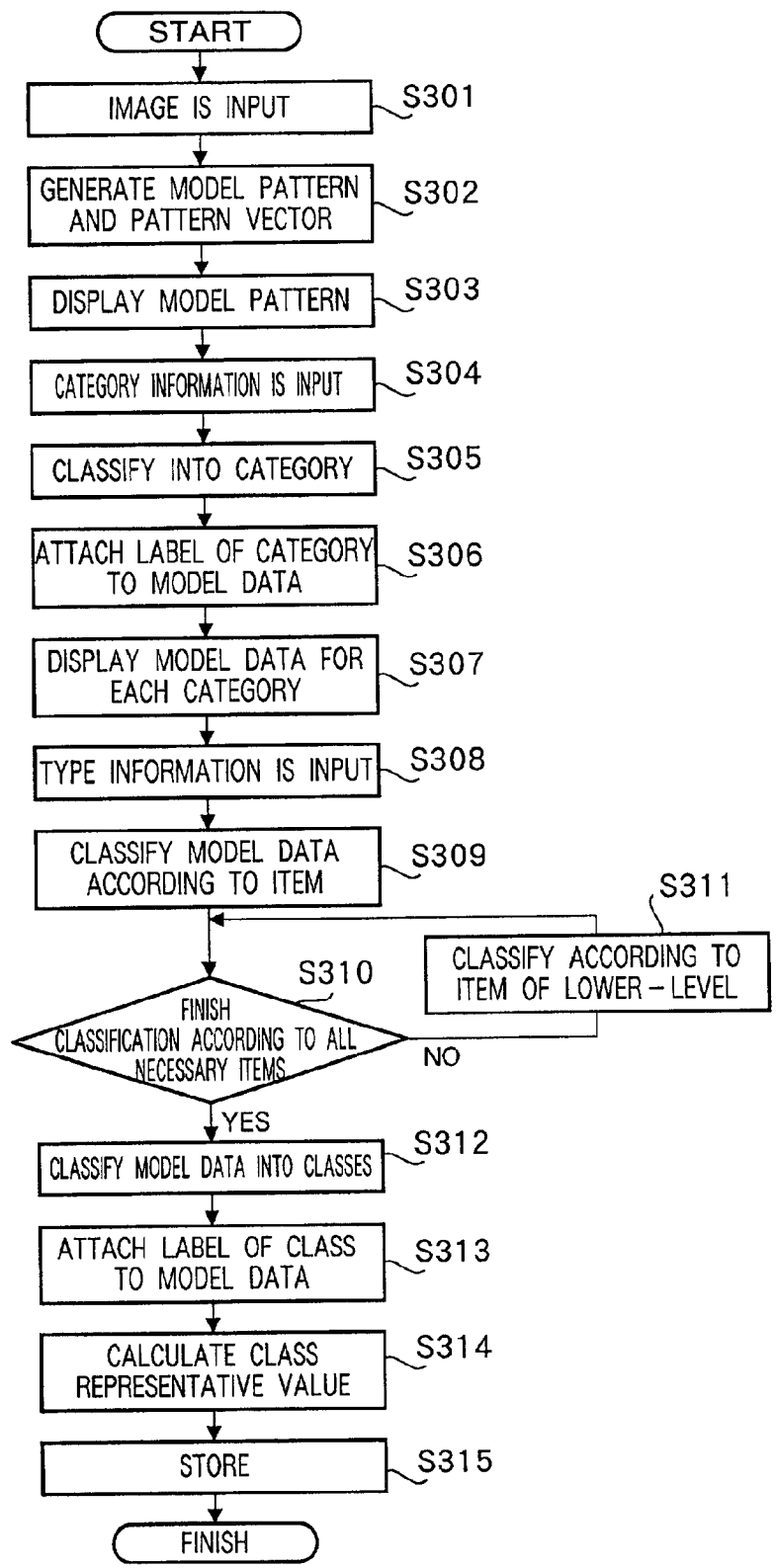
FIG. 6 is an operation flowchart of the offline processing of the data classifying apparatus according to the first embodiment.

The offline processing in data classifying apparatus 100 will be described next with reference to an operation flowchart of the offline processing in FIG. 6. FIG. 6 is the operation flowchart of the offline processing in the data classifying apparatus according to the first embodiment.

Data classifying apparatus 100 receives model data input from image database 108, and stores the data in image memory 109 via I/F 104 (S301).

Pattern vector generating section 201 extracts a model portion from the model data temporarily stored in image memory 109 to generate a model pattern. Further, pattern vector generating section 201 generates a pattern vector from the model pattern (S302). Next, pattern vector generating section 201 displays a model pattern corresponding to the generated pattern vector on display 113 (S303).

In response to the display, a user seeing an image of the model displayed on display 113 inputs the category information corresponding to the model pattern from keyboard 112. At this time, the category information input from the user is the category information that an application of the data classifying apparatus requires.

Thus, pattern vector generating section 201 obtains the category information input from keyboard 112 (S304), and classifies in advance the pattern vector generated in S302 into the category that the application requires (S305).

Next, pattern vector generating section 201 attaches to the pattern vector generated in S302 a label describing a name of the category to which the vector is classified in S305, to store in category-structure model data database 115 (S306).

In addition, in the first embodiment the label indicative of a category of a pattern vector is attached after classifying the vector into the category, but a case may be possible that a label with a category is attached to model data from the beginning. In this case, pattern vector generating section 201 refers to the label with the category, and thereby classifies the pattern vector into the category to store in category-structure model data database 115.

Data classifying apparatus 100 next shifts to the processing for classifying the model data into classes.

First, class structure constructing section 202 refers to category-structure model data database 115, extracts a pattern vector classified for each category, and transforms the vector into a model pattern to display on display 113 (S307).

When class structure constructing section 202 is not capable of generating a model pattern from a pattern vector, the section 202 extracts model data corresponding to the pattern vector from image memory 109, and generates the model pattern from the extracted model data to display on display 113.

In addition, it may be possible that a model pattern generated in pattern vector generating section 201 is stored in class-structure model data database 116, and that class structure constructing section 202 extracts the model pattern from class-structure model data database 116.

In response to the display, a user seeing the model pattern displayed on display 113 classifies the displayed model pattern according to predetermined item. Then, the user inputs the type information of the classified model pattern from keyboard 112.

Then, class structure constructing section 202 obtains the type information input from keyboard 112 (S308), and classifies the model data according to the item (S309).

Class structure constructing section 202 next determines whether the model data is classified according to all the set items (S310). In S310, when it is determined that the classification of the model data according to all the necessary items is not finished, class structure constructing section 202 classifies the model data classified in S309 according to item of a lower-level than the item used in S309 (S311). Then, the section 202 repeats the processing of S310 and S311 until the classification of the model data according to all the necessary items is finished.

In 310, when it is determined that the classification of the model data according to all the necessary items is finished, class structure constructing section 202 has finished classifying the model data into a class that is a final classification criterion for the model data (S312).

Next, class structure constructing section 202 attaches to the pattern vector generated in S308 a label with the class to which the vector is classified in S312 to store in class-structure model data database 116 (313).

The class label describes information (class number and class name) for identifying a class to which the model data belongs and a type of an item of the class.

Class structure constructing section 202 calculates a representative value of each class (S314) to store in class-structure model data database 116 (S315).

The processes executed in offline are as described above. Thus, by the offline processing, data classifying apparatus 100 is capable of reconstructing the model data items, which have been classified for each category in advance, for each class having a smaller distribution than the category.

In addition, the processing for transforming model data into a pattern vector may be executed when the pattern vector is stored in class-structure model data database 116. In this case it may be possible to generate pattern vectors with a same number of elements by, for example, performing different scale conversion on the model data for each class, or selecting different shapes of patterns for each class in extracting from classes.

Further, while in the first embodiment model data undergoes the class classification based on the category, it may be possible to generate a class structure with the category structure ignored. In this case, the model data is first classified according to all the items. When a class lying across different categories arises as a result of the classification of model data into classes, the class lying across the categories is divided according to the categories. Classes thus obtained with no class lying across categories are determined as a finally classified class structure.

Moreover, when the class classification of model data is performed with the category structure ignored, it may be possible to perform the classification according to items, and to finish the classification of the database at the time no class lying across categories exists. The need is thereby eliminated of performing the classification using all the items.

Figure 7:
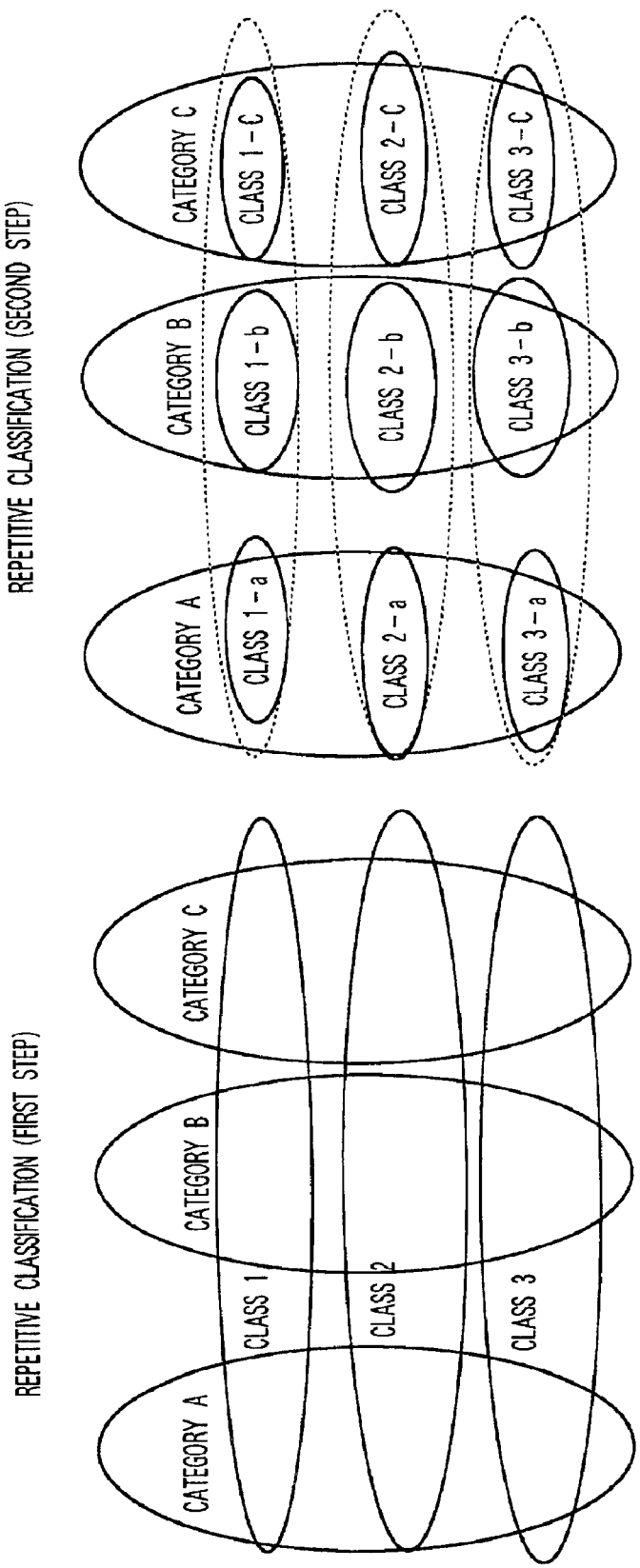
FIG. 7 is a diagram illustrating a class structure when class construction and classification is performed a plurality of number of times according to the first embodiment.

In other words, when the class classification of model data is performed with the category structure ignored, it is only required that in the class structure obtained at the time of the final classification after repeating the classification, the model data included in a class is not included in a plurality of categories. FIG. 7 illustrates an example of a class structure when the class construction and classification is performed a plurality of number of times (twice in the figure). As illustrated in FIG. 7, classes lay across a plurality of categories in a step where model data is classified using a first item, and no class exists which lays across a plurality of categories at the time the model data is classified using a second item. The classification of classes is finished at the time the classes are thus divided.

Figure 8:
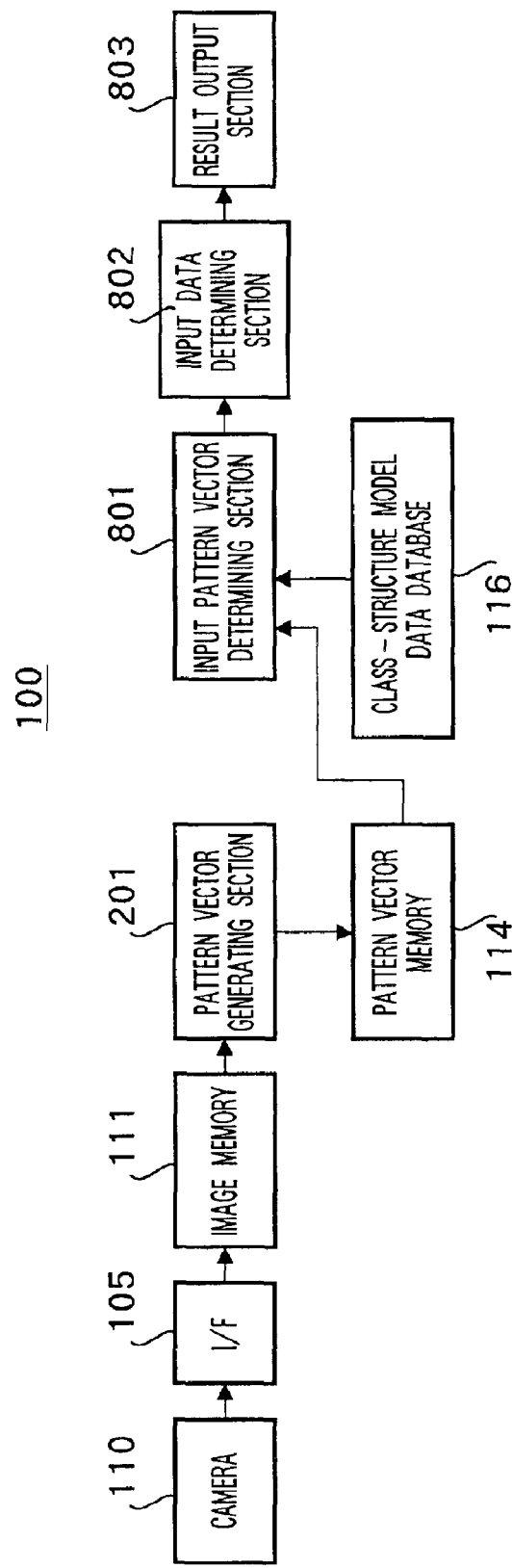
FIG. 8 is a functional block diagram for online processing in the data classifying apparatus according to the first embodiment.

The online processing of data classifying apparatus 100 will be described next. It is an object of the online processing to determine a class to which input data is most similar. A configuration for performing the online processing of data classifying apparatus 100 will be described first with reference FIG. 8. FIG. 8 is a functional block diagram for the online processing in the data classifying apparatus according to the first embodiment. In addition, the same sections as described above are assigned the same reference numerals.

Data classifying apparatus 100 is provided with camera 110 as an image data input means. Image data input from camera 110 is stored in image memory 111 via I/F 105. Data classifying apparatus 100 is provided with pattern vector generating section 201 that generates a pattern vector from the image data stored in image memory 111.

Data classifying apparatus 100 is further provided with input pattern vector determining section 801 that compares an input pattern vector of the input image generated in pattern vector generating section 201 with a representative value of each class stored in class-structure model data database 116, and calculates a degree of similarity therebetween.

Data classifying apparatus 100 is furthermore provided with input data determining section 802 that determines a class having the highest degree of similarity with the input data calculated in input pattern vector determining section 801, and a category to which the calculated class belongs to.

Data classifying apparatus 100 is still furthermore provided with result output section 803 that outputs a result of determination determined in input data determining section 802. The operation as result output section 803 is performed by I/F 107 and output terminal 118.

In this embodiment, pattern vector generating section 201, input pattern vector determining section 801 and input data determining section 802 are achieved by CPU 102 reading the program stored in memory 103.

The online processing in data classifying apparatus 100 will be described next with reference to an operation flow-chart of the online processing in FIG. 9.

Data classifying apparatus 100 receives, as its input, input data targeted for recognition from video camera 110. In data classifying apparatus 100, the input data is output to image memory 111 via I/F 105 and is stored in the memory 111 (S401).

Pattern vector generating section 201 extracts part of data from the input data temporarily stored in image memory 111, generates an input pattern vector expressed in one dimensional data sequence representative of pixel values of the part of data, and stores the vector in pattern vector memory 114 (S402).

In addition, when pattern vectors of model data stored in class-structure model data database 116 are generated in different methods for each class, pattern vector generating section 201 generates an input pattern vector from input data according to a pattern vector generating method determined for each class.

Further, pattern vector generating section 201 stores a coordinate of a center point of the input pattern vector in pattern vector memory 114, as a representative value of the input pattern vector.

Data classifying apparatus 100 next shifts to optimal matching processing for determining model data to which the input data is most similar. First, input pattern vector determining section 801 calculates a degree of similarity between a representative value of the input pattern vector of the input data stored in pattern vector memory 114 and each of respective representative values 503 of classes stored in class-structure model data database 116 (S403). In this embodiment the degree of similarity is determined by Euclid distance between a respective value (point) of an input pattern vector and representative value 503 of each class. In other words, as an Euclid distance between a respective value of an input pattern vector and representative value 503 of each class is decreased, the degree of similarity is increased.

Input data determining section 802 compares the degrees of similarity, determined in input pattern vector determining section 801, between the representative value of the input pattern vector of the input data and respective representative values 503 of classes, and determines a class with the highest degree of similarity as a result of the recognition (S404).

Input data determining section 802 further determines a category to which the class having the highest degree of similarity with the input pattern vector.

Result output section 803 outputs the class, type in the class, category and input pattern vector determined in input data determining section 802 (S405).

Thus, result output section 803 outputs the type in the class and category as well as the class corresponding to the input data, and it is thereby possible to recognize the input data more accurately. For example, when a category corresponding to input data is of "Mr.A" and the type in the class is of "rightward face", it is recognized that the input image is of "a rightward face of Mr.A. Further, when an image is input of a picture of a vehicle taken from a distance by a camera and a category corresponding to the image is of "sedan" while the type in the class is of "distance of 50 m", it is recognized that the input data is of "sedan" and that a distance from the sedan is "50 m".

As described above, according to the first embodiment, by comparing input data with a representative value of a class, it is possible to obtain a class to which the input data belongs, and to further obtain a category to which the input data belongs from the class to which the input data belongs. Further, since the class has a smaller distribution than the category, it is possible to obtain the class to which the input data belongs accurately, and it is therefore possible to accurately determine the category to which the input data belongs from the class to which the input data belongs. In other words, regardless of size of distribution of category, it is possible to properly determine a category to which input data belongs. Accordingly, it is possible to increase accuracy of data classification, and to perform practical data classification.

Further, in the first embodiment, since classes are divided so finely that each class does not belong to a plurality of categories, it is possible to accurately determine a category to which input data belongs from a class to which the input data belongs.

Furthermore, in the first embodiment, since model data is transformed into a pattern vector expressed in one dimensional vector representative of part of the data extracted from the model data, while input image data is treated as an input pattern vector expressed in one dimensional vector representative of an input pattern extracted from the input image data, it is possible to narrow a range targeted for the classification of the model data and input data, and to determine a class to which the input data belongs efficiently and properly.

Moreover, data classifying apparatus 100 is capable of increasing the data classification accuracy by executing the above-mentioned offline and online processing repeatedly. That is, when in the online processing input data determining section 802 determines that input data belongs to a plurality of categories, class structure constructing section 202 adds a new item and classifies model data items into classes, so that any distribution of a class does not belong to a plurality of categories. The reconstruction of class is thus performed until any distribution of a class does not belong to a plurality of categories, and it is thereby possible to classify the model data items into proper classes. As a result, it is possible to accurately determine a category to which the input data belongs from a class to which the input data belongs.

Further, it is possible to apply data classifying apparatus 100 according to this embodiment to general material recognizing apparatuses that perform material recognition such as image recognition.

As a specific example, an authentication system of authenticating faces may be achieved by using as model data items images of faces classified according to category, receiving an image of a face, and determining a category to which the input image of a face belongs. Further, the apparatus 100 is applicable to a distance detection system of recognizing a distance of an input image in a practical space by using as model data items a plurality of images taken from different distances, further using distances as categories, and recognizing a category with the highest degree of similarity with the input image. Furthermore, by varying a type of input data and model data, it may be possible to apply data classifying apparatus 100 to a gate system, iris authentication system, fingerprint identification system, character recognition system, people detection system, vehicle detection system, and vehicle recognition system and the like.

Thus, applying data classifying apparatus 100 to material recognizing apparatuses increases the material recognition accuracy in the material recognizing apparatuses.

Further, while in the first embodiment image data is classified using the image data as input data, any data may be used as input data as long as the data enables classification thereof according to concept as the category so as to recognize a category to which the data belongs.

In addition, in the first embodiment model data is transformed into a pattern vector to be stored in category-structure model data database 115 and class-structure model data database 116. However, it may be possible to store the model data in the form of either a model pattern or the model data. In this case, as needed, the model pattern or model data may be extracted from category-structure model data database 115 and class-structure model data database 116 to generate a pattern vector.

(Second Embodiment)

In the second embodiment, a coordinate system is transformed into a characteristic coordinate system (characteristic space) with characteristics that a between-class variance is as large as possible while a within-class variance is as small as possible with each variance obtained from model data items, and input image data is compared with classes on the characteristic coordinate system. It is thus possible to perform accurate comparison between the input data and classes.

Figure 10:
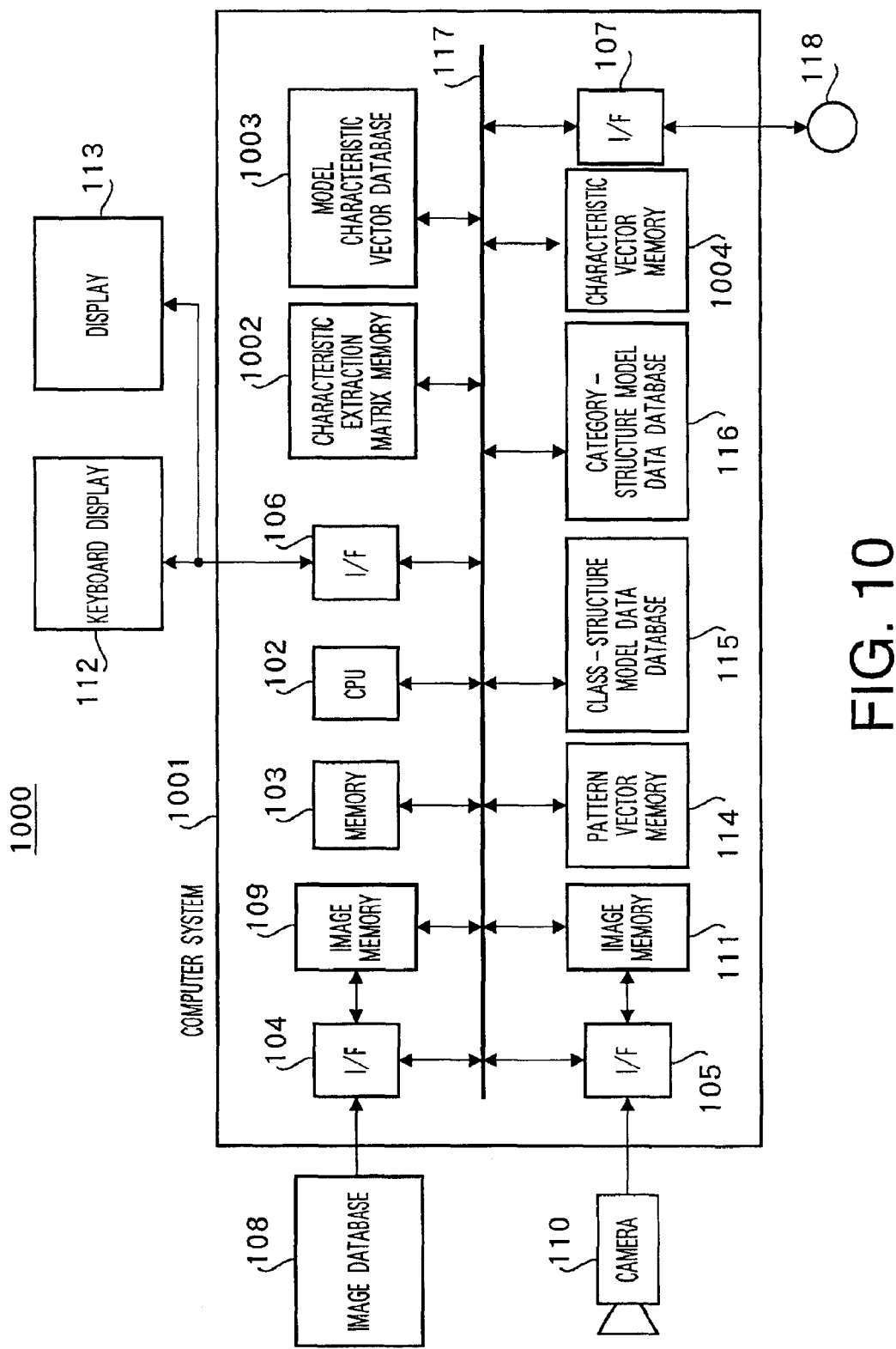
FIG. 10 is a block diagram of a data classifying apparatus according to a second embodiment of the present invention.

A data classifying apparatus according to the second embodiment will be described below. A configuration of the data classifying apparatus in the second embodiment will be described first with reference to FIG. 10. FIG. 10 is a block diagram of the data classifying apparatus according to the second embodiment.

A difference between data classifying apparatus 1000 according to the second embodiment and data classifying apparatus 100 of the first embodiment is that computer system 1001 of the second embodiment is provided with characteristic extraction matrix memory 1002, model characteristic vector database 1003 and characteristic vector memory 1004.

Characteristic extraction matrix memory 1002 stores a characteristic extraction matrix for transforming a coordinate system into a characteristic coordinate system. In addition, the characteristic coordinate system and characteristic extraction matrix will be described specifically below.

Model characteristic vector database 1003 is a database storing characteristic vectors (model characteristic vectors) of model data obtained by transforming the model data stored in class-structure model data database 116 by the characteristic extraction matrix. Model characteristic vector database 1003 further stores representative values for each class as well as model characteristic vectors. The representative values for each class stored in model characteristic vector database 1003 are representative values of model characteristic vectors belonging to respective classes.

Characteristic vector memory 1004 is a memory for storing a characteristic vector (input characteristic vector) obtained by transforming an input pattern vector of input data by the characteristic extraction matrix.

Data classifying apparatus 1000 configured as described above executes offline processing for constructing class-structure model data database 116 from category-basis-classified category-structure model data database 115, and further performing calculation of characteristic extraction matrix and construction of model characteristic vector database 1003, and online processing for performing class determination for determining a class to which input data is most similar.

Figure 11:
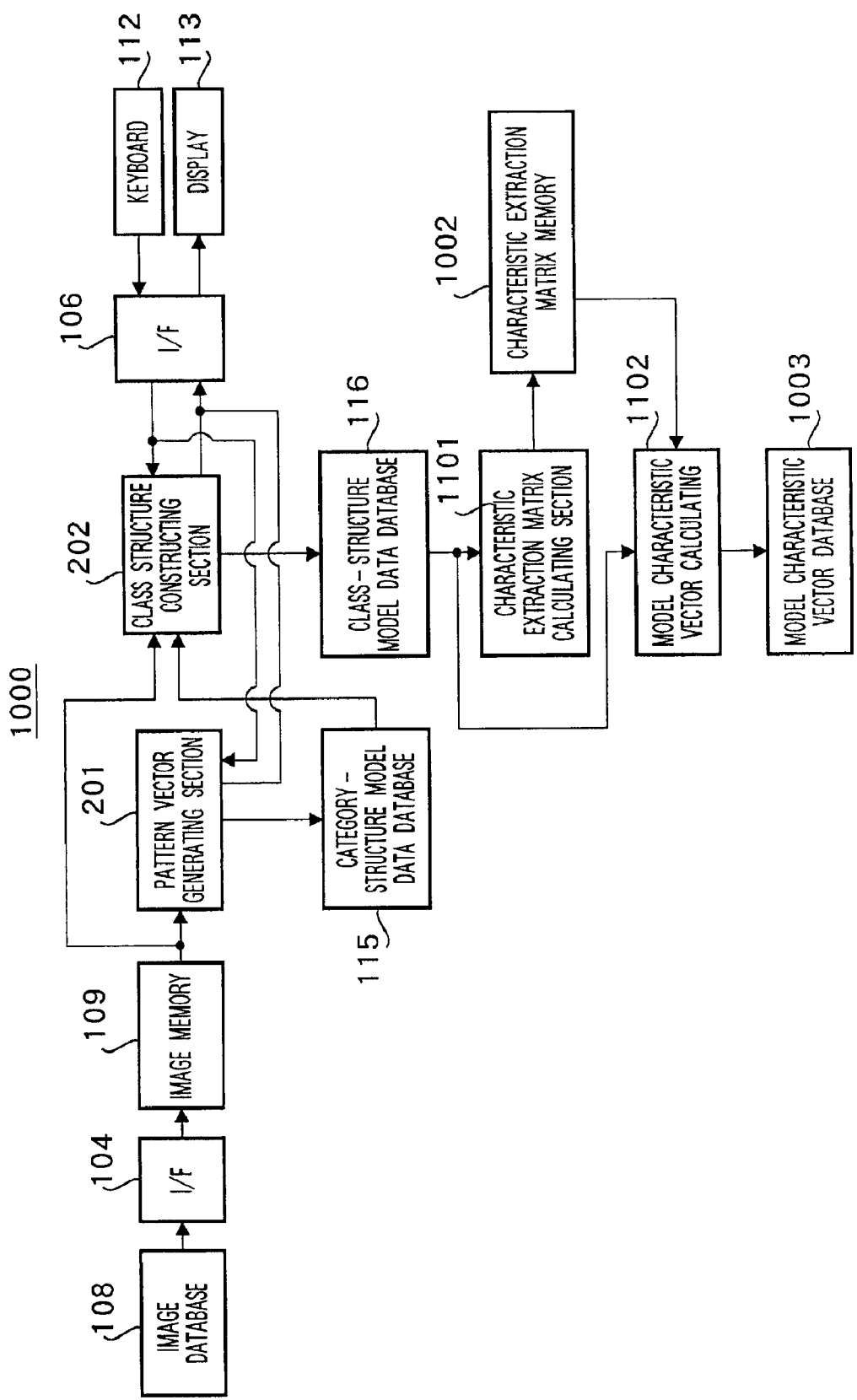
FIG. 11 is a functional block diagram for offline processing in the data classifying apparatus according to the second embodiment.

The offline processing of data classifying apparatus 1000 will be described below. A configuration for performing the offline processing of data classifying apparatus 1000 will be described first with reference FIG. 11. FIG. 11 is a functional block diagram for the offline processing in the data classifying apparatus according to the second embodiment. In addition, the same sections as described above are assigned the same reference numerals.

Data classifying apparatus 1000 of the second embodiment differs from data classifying apparatus 100 of the first embodiment in a respect that the apparatus 1000 is provided with characteristic extraction matrix calculating section 1101 as a learning means for generating characteristic vectors from model data in advance, characteristic extraction matrix memory 1002, model characteristic vector calculating section 1102, model characteristic vector database 1003.

Characteristic extraction matrix calculating section 1101 calculates the characteristic extraction matrix enabling pattern vectors included in a class to be most collected while enabling classes to be most separated, from pattern vectors stored in class-structure model data database 116. Then, characteristic extraction matrix calculating section 1101 stores the calculated characteristic extraction matrix in characteristic extraction matrix memory 1002.

Model characteristic vector calculating section 1102 transforms pattern vectors using the characteristic extraction matrix stored in characteristic extraction matrix memory 1002, calculates a model characteristic vector of each model data, and classifies the vector into a class to store in model characteristic vector database 1003. Further, model characteristic vector calculating section 1102 stores a representative value that is an average value of model characteristic vectors included in each class in model characteristic vector database 1003. In addition, the representative value of model characteristic vectors for each class is not limited to an average value, and may be another value such as a barycentric value.

A structure of model characteristic vector database 1003 is as illustrated in FIG. 12. FIG. 12 is a structure diagram of the model characteristic vector database according to the second embodiment.

Model characteristic vector database 1003 stores a plurality of sets of class 501, model characteristic vector 1201 of model data corresponding to class 501, and representative value (vector) 1202 of model characteristic vector 1201 in class 501.

In addition, it may be possible for model characteristic vector database 1003 not to store model characteristic vector 1201 of model data.

In the second embodiment, the processing of characteristic extraction matrix calculating section 1101 and model characteristic vector calculating section 1102 is achieved by CPU 102 executing the program.

The offline processing of data classifying apparatus 1000 will be described below with reference to an operation flowchart of the offline processing in FIG. 13.

It is an object of the offline processing to construct class-structure model data database 116 from category-structure model data database 115, calculate a characteristic extraction matrix from class-structure model data database 116, and further construct model characteristic vector database 1003 using the characteristic extraction matrix.

Data classifying apparatus 1000 first executes the processing of S301 to S315 in the same way as in the first embodiment, and constructs class-structure model data database 116 from category-structure model data database 115 (S1301).

Then, data classifying apparatus 1000 calculates a characteristic extraction matrix in following procedures. For example, as a data discrimination method, a method is known described in "The use of multiple measurements in taxonomic problems" by Fisher. R. A., Ann.Eugenics.7.Part II, pages 179 to 188, 1936". The characteristic extraction matrix is calculated according to the principle of the discrimination function of Fisher.

First, characteristic extraction matrix calculating section 1101 refers to class-structure model data database 116, and extracts a set of pattern vectors classified into the same class. Then, characteristic extraction matrix calculating section 1101 calculates a within-class covariance matrix $C_W$ from the set of pattern vectors for each class according to equation 1 (S1302).

[Eq. 1]　　　　　　　　　　　　　　　　　(1)

$$\begin{aligned}
C_W &= \sum_{i=1}^{K} \omega_i C_i \\
\bar{x}_i &= \frac{1}{n_i} \sum_{class\ i} x \\
C_i &= \frac{1}{n_i} \sum_{class\ i} (x - \bar{x}_i)(x - \bar{x}_i)^T \\
\omega_i &= \Pr(class\ i) > 0, \sum_{i=1}^{K} \omega_i = 1
\end{aligned}$$

x: PATTERN VECTOR $n_i$: THE NUMBER OF SPECIES class i

K: THE NUMBER OF CLASSES

Then, characteristic extraction matrix calculating section 1101 calculates a between-class covariance matrix $C_B$ from sets of pattern vectors according to equation 2 (S1303).

[Eq. 2]　　　　　　　　　　　　　　　　　(2)

$$\begin{aligned}
C_B &= \sum_{i=1}^{K} \omega(\bar{x}_i - \bar{x}_T)(\bar{x}_i - \bar{x}_T)^T \\
\bar{x}_T &= \sum_{i=1}^{K} \omega_i x_i :
\end{aligned}$$

ALL AVERAGE VECTOR CVER THE ENTIRE CLASS

Further, characteristic extraction matrix calculating section 1101 calculates a total class covariance matrix $C_T$ according to equation 3.

[Eq.3]

$$C_W + C_B = C_T \quad (3)$$

TOTAL COVARIANCE MATRIX

At this point, according to the principle of Fisher, characteristic extraction matrix calculating section 1101 calculates, as a discrimination estimate standard, a transformation vector a that maximizes a variance ratio J (equation 4) of the between-class variance that is a variance between classes to the within-class variance that is a variance within the classes so that the between-class variance is increased as much as possible and that the within-class variance is decreased as small as possible.

[Eq. 4]　　　　　　　　　　　　　　　　　(4)

$$J(a) = \frac{a^T C_B a}{a^T C_W a} \quad \text{(ESTIMATE STANDARD)}$$

a: TRANSFORMATION VRECTOR

Figure 14:
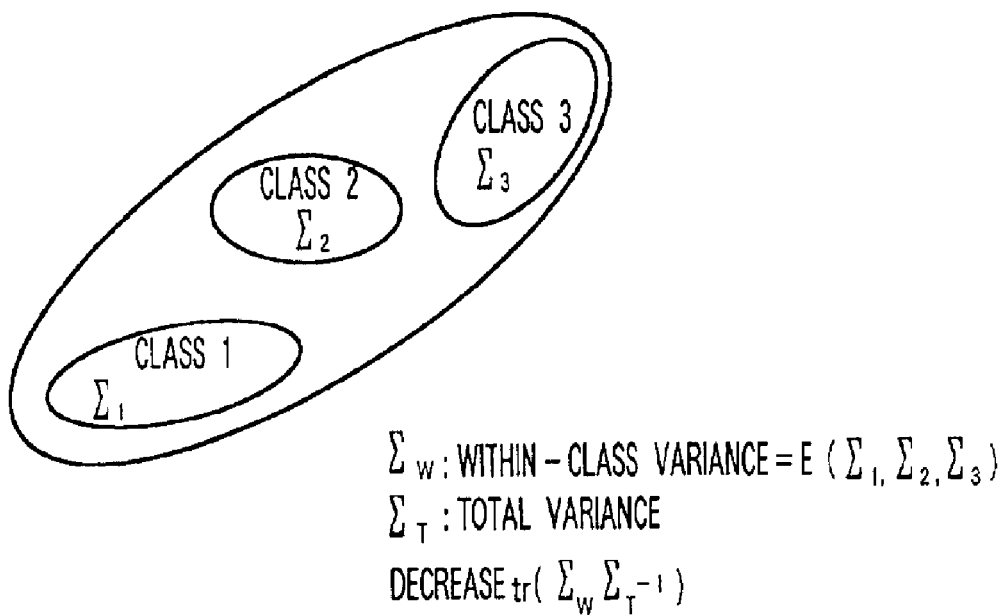
FIG. 14 is a conceptual diagram of a discrimination analysis method with three classes.

FIG. 14 illustrates a conceptual diagram of a discrimination analysis method with three classes. As can be seen from FIG. 14, by decreasing the within-class variance while increasing the between-class variance, a distribution area between classes is increased. Thus characteristics of classes are clarified.

Obtaining the transformation vector a that maximizes the variance ratio J (equation 4) is equal to solving a characteristic value problem (equation 5).

[Eq.5]

$$C_B A = C_W A \Lambda \quad (5)$$

$\Lambda$:CHARACTERISTIC VALUE MATRIX diag($\lambda_1 \ldots, \lambda_N > 0$)

A:CHARACTERISTIC VECTOR MATRIX[$\alpha_1 \ldots \alpha_N$]

Therefore, characteristic extraction matrix calculating section 1101 obtains $A^T$ from equation 5, and stores obtained $A^T$ as a characteristic extraction matrix in characteristic extraction matrix memory 1002 (S1304).

Then, model characteristic vector calculating section 1102 refers to characteristic extraction matrix memory 1002, and obtains the characteristic extraction matrix. Using the characteristic extraction matrix, model characteristic vector calculating section 1102 transforms the model data stored in class-structure model data database 116 to calculate model characteristic vectors (S1305). Model characteristic vector calculating section 1102 registers the calculated model characteristic vectors with model characteristic vector database 1003 (S1306).

Next, model characteristic vector calculating section 1102 obtains representative values of model characteristic vectors for each class by calculating an average value of model characteristic vectors of each class (S1307) to register with model characteristic vector database 1003 (S1308).

The processes for data classifying apparatus 1000 to execute in offline are as described above.

Thus, according to the second embodiment, by the offline processing, it is possible to compare input data with classes with the distribution of model data within each class decreased and with the class distribution between the classes increased. In other words, since it is possible to compare input data with the classes with characteristics of distributions of the classes clarified, it is possible to perform accurate comparisons between input data and the classes.

Figure 15:
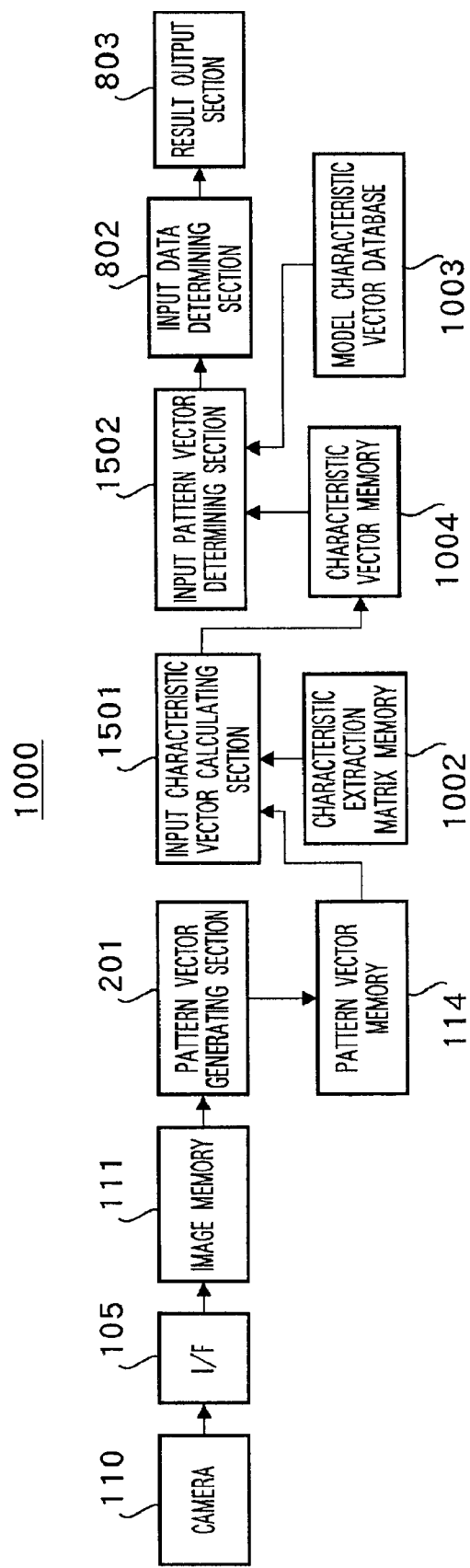
FIG. 15 is a functional block diagram for online processing in the data classifying apparatus according to the second embodiment.

The online processing in data classifying apparatus 1000 will be described next. It is an object of the online processing to determine a class to which an input image is most similar. A configuration for performing the online processing of data classifying apparatus 1000 will be described first with reference FIG. 15. FIG. 15 is a functional block diagram for the online processing in the data classifying apparatus according to the second embodiment. In addition, the same sections as described above are assigned the same reference numerals.

Data classifying apparatus 1000 of the second embodiment differs from data classifying apparatus 100 of the first embodiment in a respect that the apparatus 1000 is provided with characteristic extraction matrix memory 1002, input characteristic vector calculating section 1501, characteristic vector memory 1004, input pattern vector determining section 1502, and model characteristic vector database 1003.

Input characteristic vector calculating section 1501 extracts the characteristic extraction matrix calculated in the offline processing from characteristic extraction matrix memory 1002, and using the characteristic extraction matrix, transforms an input pattern vector stored in pattern vector memory 114 to calculate an input characteristic vector. Input characteristic vector calculating section 1501 stores the calculated input characteristic vector in characteristic vector memory 1004.

Input pattern vector determining section 1502 compares the input characteristic vector stored in characteristic vector memory 1004 with each of representative values 1202 stored in model characteristic vector database 1003, and calculates a degree of similarity.

In addition, in the second embodiment, the processing of input characteristic vector calculating section 1501 and input patter vector determining section 1502 is performed by CPU 102 executing the program.

Figure 16:
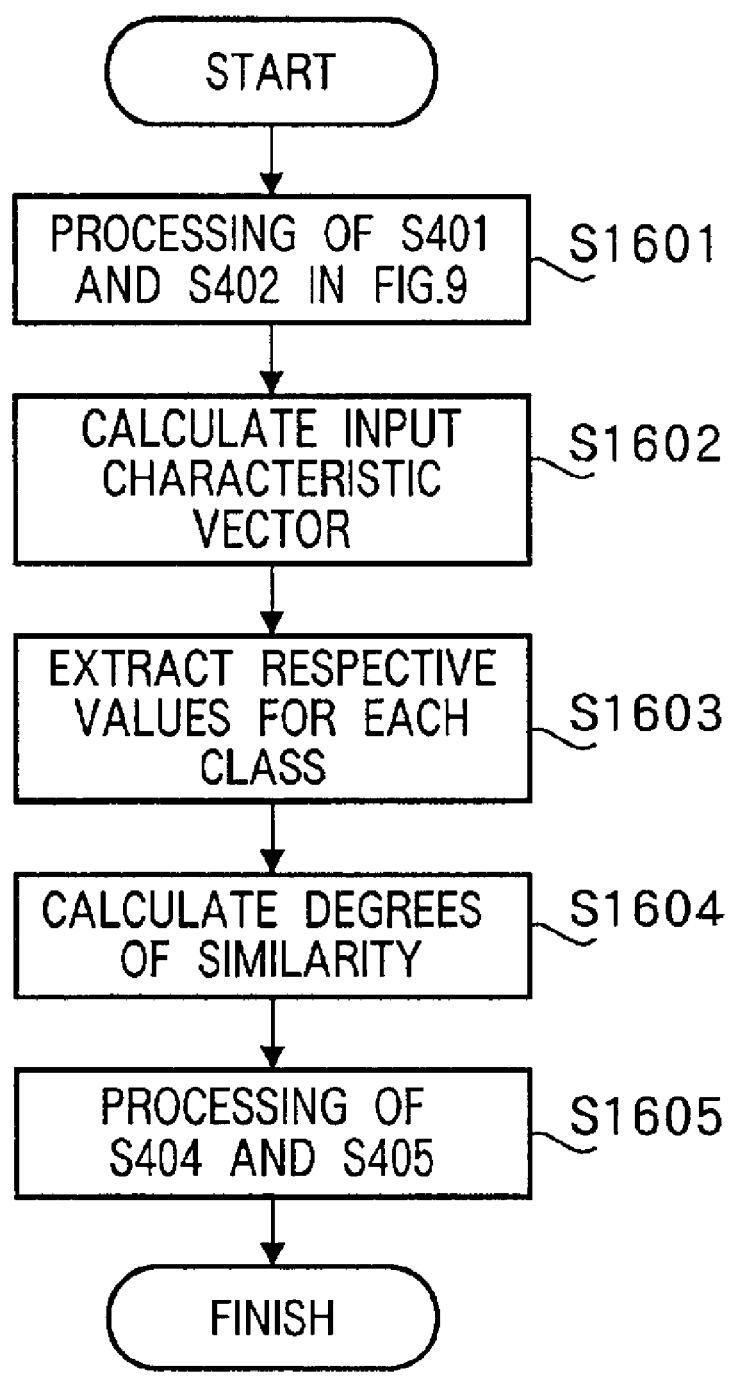
FIG. 16 is an operation flowchart for the online processing in the data classifying apparatus according to the second embodiment.

The online processing of data classifying apparatus 1000 will be described next with reference to an operation flow-chart of the online processing in FIG. 16.

Data classifying apparatus 1000 first executes the processing of S401 and S402 in the same way as in the first embodiment, and generates an input pattern vector b to store in pattern vector memory 114 (S1601).

Input characteristic vector calculating section 1501 calculates an input characteristic vector f according to equation 6, using the input pattern vector b stored in pattern vector memory 114 with the characteristic extraction matrix $A^T$, obtained in the offline processing, stored in characteristic extraction matrix memory 1002 (S1602).

[Eq.6]

$$f = A^T b \text{(SUN OF MATRIX } A^T \text{ AND VECTOR} b\text{)} \quad (6)$$

Then, input characteristic vector calculating section 1501 stores the input characteristic vector f in characteristic vector memory 1004.

Next, input pattern vector determining section 1502 extracts the representative value of each class stored in model characteristic vector database 1003 (S1603). Input pattern vector determining section 1502 calculates a relative distance between the input characteristic vector f stored in characteristic vector memory 1004 and representative value 1202 of each class to calculate a degree of similarity (S1604). The degree of similarity is increased as a relative distance between the input characteristic vector f and representative value 1202 of each class is decreased.

Figure 9:
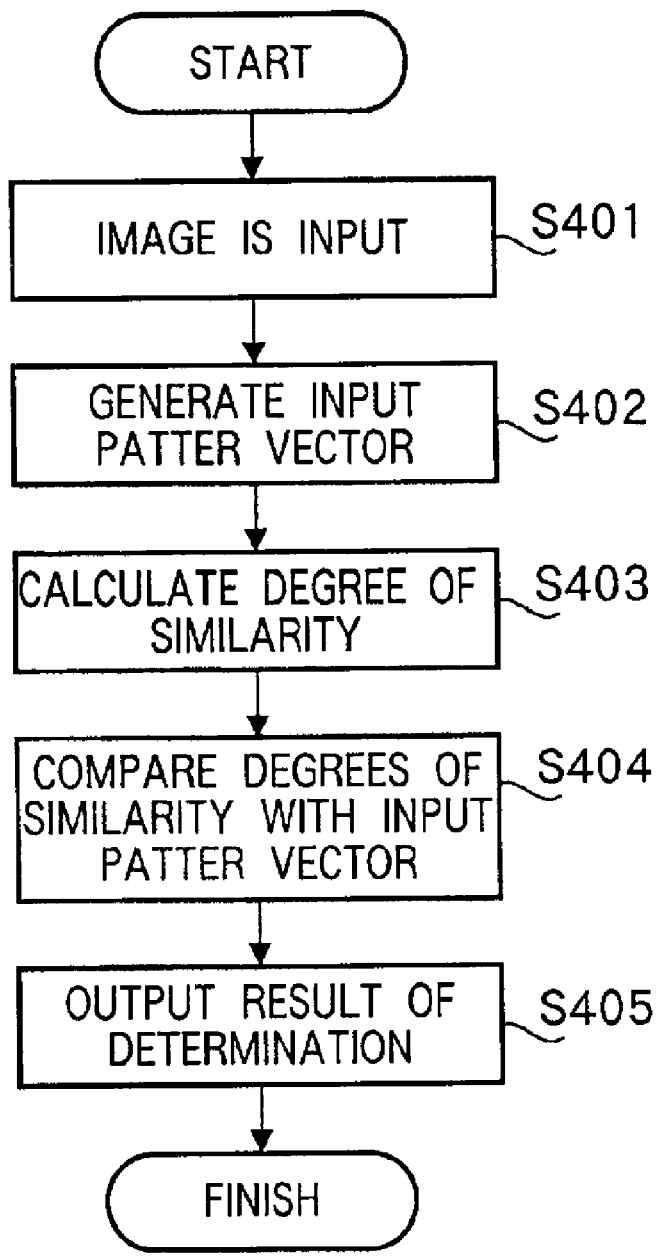
FIG. 9 is an operation flowchart for the online processing in the data classifying apparatus according to the first embodiment.

Input data determining section 802 executes the processing of S404 and S405 illustrated in FIG. 9 in the same way as in the first embodiment, and outputs a class with the highest degree of similarity as a result of recognition.

As described above, according to the second embodiment, it is possible to compare input image data with classes in the transformed characteristic coordinate system (characteristic space) with characteristics that the between-class variance is as large as possible while the within-class variance is as small as possible. In other words, the comparison between the input data and class can be performed in a coordinate system with characteristics of each class appearing greatly. Thus, a coordinate system is transformed into one suitable for classification, then the input data is compared with classes, and it is thereby possible to perform accurate comparison of the input data. As a result, it is possible to accurately classify the input data into a class.

Further, according to the second embodiment, it is possible to obtain the characteristic extraction matrix for transforming a coordinate system into a system such that the between-class variance is as large as possible while the within-class variance is as small as possible, using the between-class covariance matrix and within-class covariance matrix. By thus using the between-class covariance matrix and within-class covariance matrix, the characteristic extraction matrix is obtained readily.

It is possible to calculate the characteristic extraction matrix $A^T$ for transforming a coordinate system so that the variance ratio J is maximized which is a radio of the between-class covariance matrix $C_B$ to the within-class covariance matrix $C_W$. The characteristic extraction matrix $A^T$ can be calculated by obtaining a matrix for transforming a coordinate system so as to maximize the variance ratio J. Since the coordinate system that maximizes the variance ratio J is a coordinate system such that the between-class covariance matrix $C_B$ is large while the within-class covariance matrix $C_W$ is small, the characteristic extraction matrix $A^T$ can be obtained by obtaining a matrix for transforming a coordinate system so that the variance ratio J is maximized. Thus, it is possible to obtain the characteristic extraction matrix $A^T$ easily by calculation.

Further, while in the second embodiment characteristic vectors are used as characteristic amounts indicative of characteristics of input image data and model data, a method of indicating characteristic amounts is not limited to characteristic vectors. For example, simple numeral values may be used as the characteristic amounts.

In addition, in the second embodiment the characteristic extraction matrix is obtained which transforms a coordinate system so that the between-class variance is as large as possible while the within-class variance is as small as possible. However, it may be possible to use as a characteristic extraction matrix a matrix for transforming a coordinate system so that the between-class variance is as large as possible, or a matrix for transforming a coordinate system so that the within-class variance is as small as possible. Also by using these characteristic extraction matrices, it may be possible to transform a coordinate system into a coordinate system that clarifies class characteristics.

Further, while in the second embodiment, as the characteristic extraction matrix, a matrix is used with the within-class variance and between-class variance considered, any matrix may be used as long as the matrix is to transform a coordinate system into a coordinate system with characteristics for each class appearing clearly. For example, as the characteristic extraction matrix, a matrix may be used which transforms a coordinate system into a system for performing a principal component analysis, subspace method, or the like. The coordinate system for performing the principal component analysis is a coordinate system (characteristic space) that extends distances between model data items that are sample data items. Further, a coordinate system for performing the subspace method is a coordinate system that indicates characteristics of classes with lower dimension of the coordinate system. In addition, the principal component analysis and subspace method are disclosed in "Pattern Recognition" by Mori, Kenichi, IEICE, (1998).

(Third Embodiment)

In the third embodiment, in reconstructing classes in the database, the classes are reconstructed so that the within-class variance is decreased without user operation.

Figure 17:
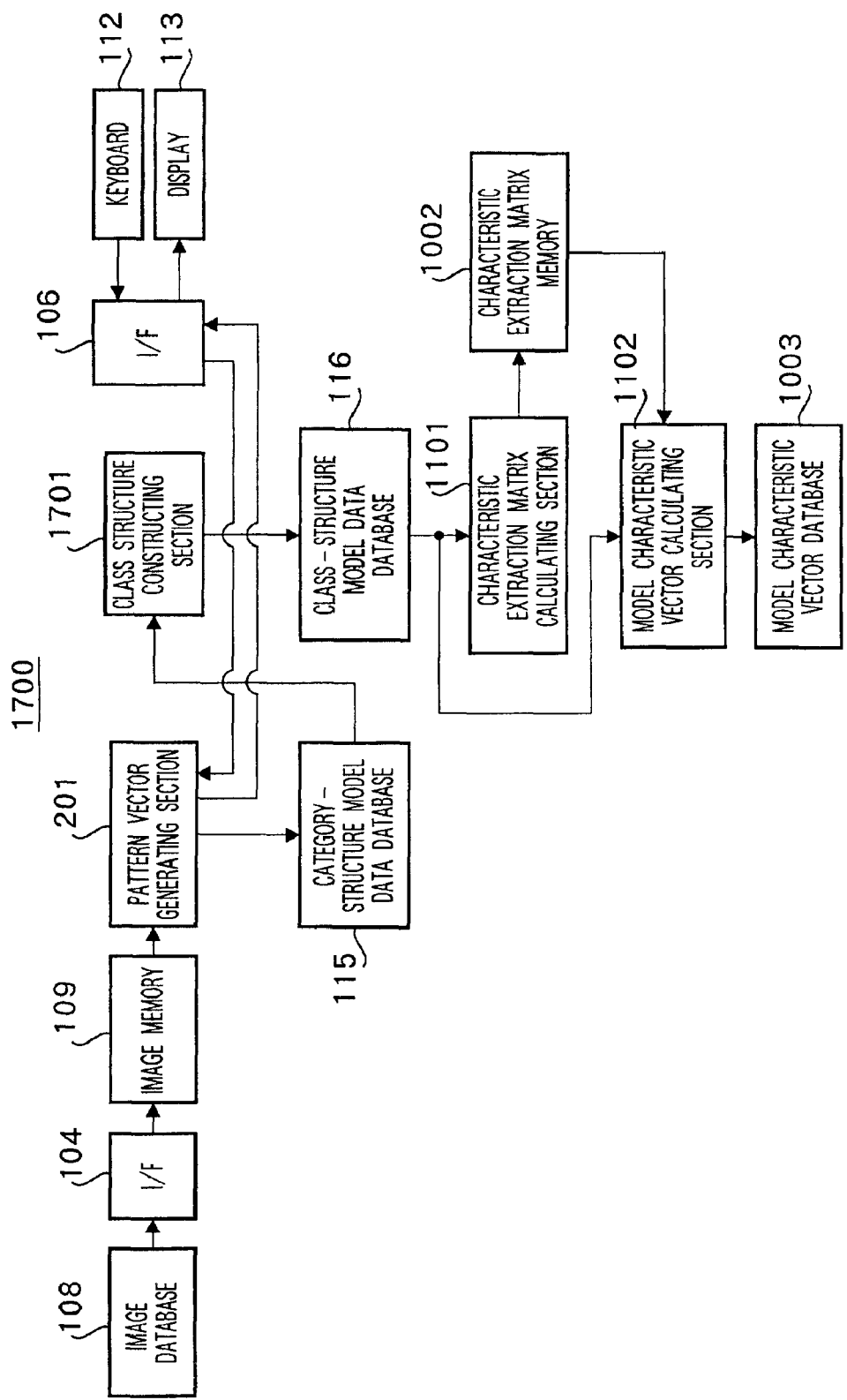
FIG. 17 is a functional block diagram for offline processing in the data classifying apparatus according to a third embodiment of the present invention.

Classes in a data classifying apparatus according to the third embodiment will be described below. A difference between the second embodiment and third embodiment is the offline processing, and only the offline processing will be described. A configuration for performing the offline processing of data classifying apparatus 1700 according to the third embodiment will be described first with reference FIG. 17. FIG. 17 is a functional block diagram for the offline processing in the data classifying apparatus according to the third embodiment. In addition, the same sections as described above are assigned the same reference numerals.

Data classifying apparatus 1700 according to the third embodiment is provided with class structure constructing section 1701, and in this respect, differs from data classifying apparatus 1000 according to the second embodiment. In the second embodiment a user inputs information on the class classification of model data, and based on the input, the model data is classified. In contrast thereto, in the third embodiment, the processing of the class classification is performed without requiring user operation. In response to the foregoing, information is not input from keyboard 112 to class structure constructing section 1701.

Specifically, using an ISODATA method, class structure constructing section 1701 classifies model data items into classes so that the within-class variance is decreased. In addition, while in this embodiment class structure constructing section 1701 uses the ISODATA method as a clustering method, it may be possible to use another clustering method such as a K-mean method besides the ISODATA. The ISODATA method is described in "Pattern Recognition" by Mori, Kenichi, IEICE, page 122, (1998). Specifically, the ISODATA method is a clustering method for decreasing the within-class variance by repeating division and merger of cluster.

Further, in obtaining the characteristic extraction vector by the linear discrimination analysis method of Fisher, class structure constructing section 1701 first transforms a coordinate system so that the total covariance matrix $C_T$ of all the model data becomes a unit matrix so as to simplify calculation of the characteristic extraction matrix, and then performs the class classification.

Figure 18:
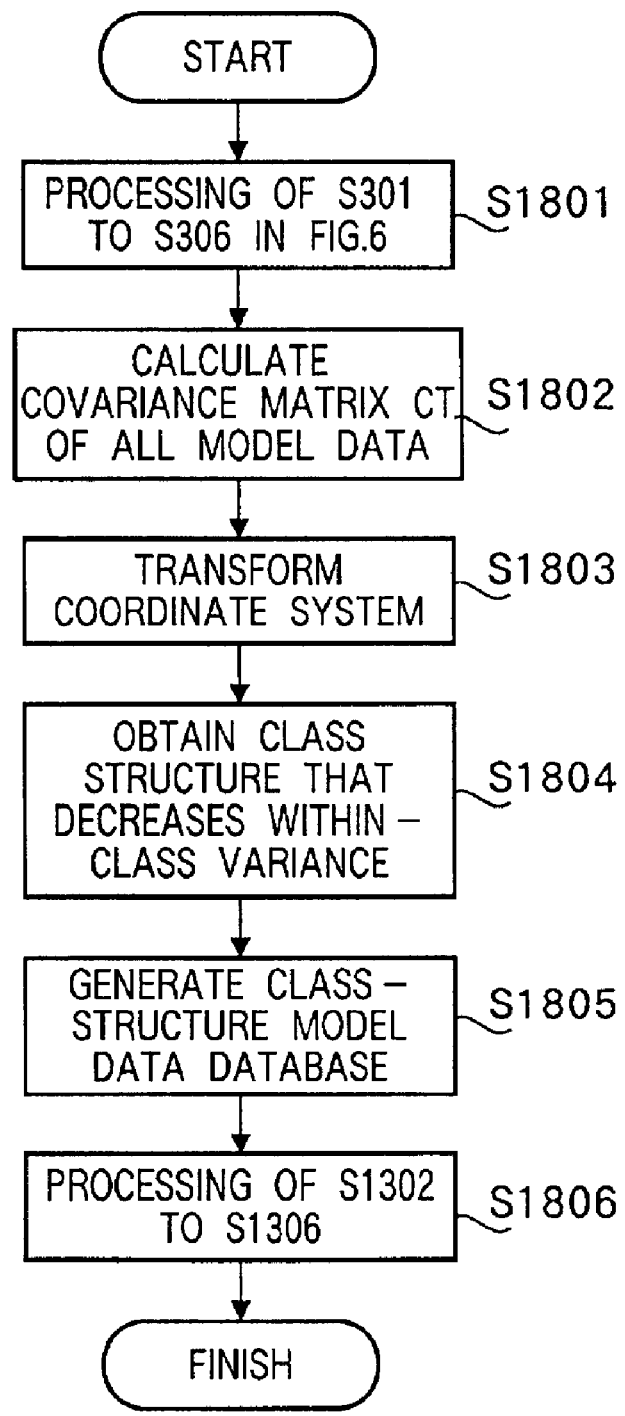
FIG. 18 is an operation flowchart for the offline processing in the data classifying apparatus according to the third embodiment.
Figure 19:
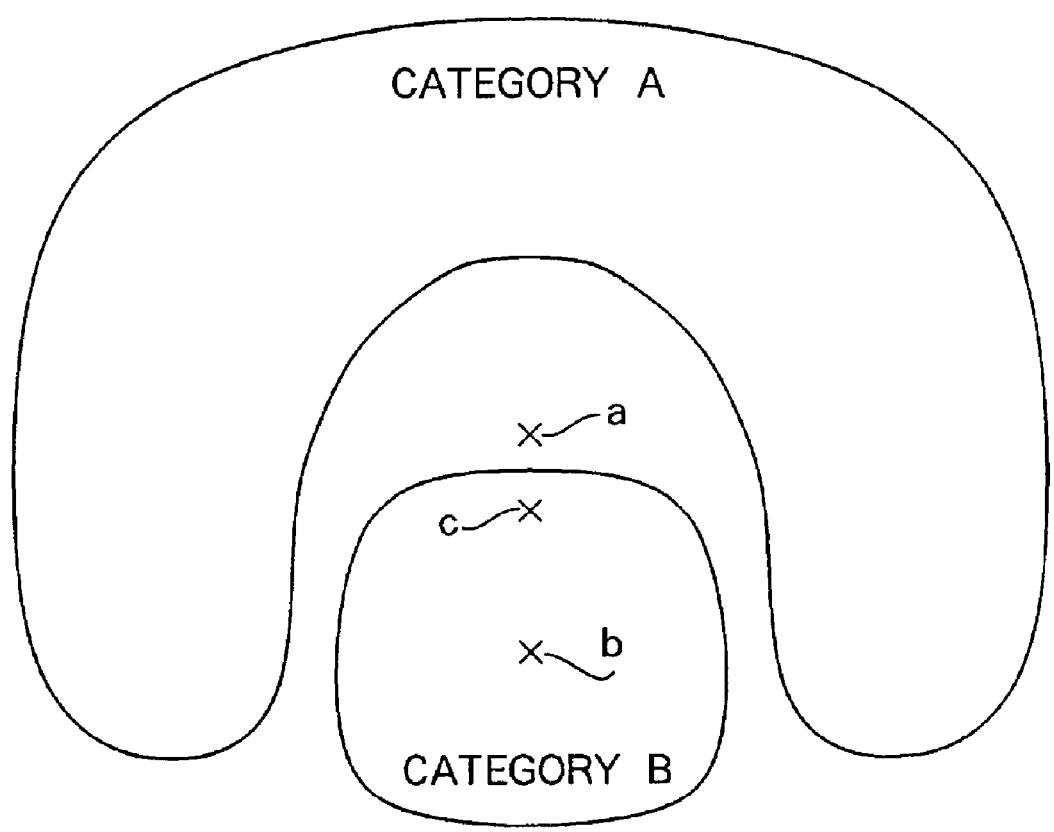
FIG. 19 is a diagram illustrating representative vectors of categories and distributions of the categories.

The offline processing in data classifying apparatus 1700 will be described next with reference to an operation flowchart of the offline processing in FIG. 18.

Class structure classifying section 1701 first performs the processing of S301 to S306 in FIG. 6 in the same way as in the first embodiment, and constructs category-structure model data database 115 (S1801).

Class structure classifying section 1701 next extracts all the model data items from category-structure model data database 115, and calculates the total covariance matrix $C_T$ of model data group (S1802). It is because data classifying apparatus 1700 calculates a discrimination standard $J_1$ indicated in equation 7 in a latter step, and calculates the characteristic extraction vector by maximizing the determination standard $J_1$.

[Eq.7]

$$J_1 = tr[\tilde{C}_W^{-1}\tilde{C}_T] = tr[(A^T C_W A)^{-1}(A^T C_T A)] \quad (7)$$

The characteristic extraction matrix $A^T$ that maximizes the discrimination standard $J_1$ is obtained by solving the characteristic value problem with $C_T$ substituted for $C_B$ in equation 5. When the total covariance matrix $C_T$ is a unit matrix, it becomes very easy to solve the characteristic value problem with $C_T$ substituted for $C_B$ in equation 5.

By examining properties of the discrimination standard $J_1$, it is understood that the properties are not changed when the discrimination standard $J_1$ undergoes regular linear transform. In other words, it is indicated that the class structure that maximizes the discrimination standard $J_1$ is the same regardless of coordinate system.

Accordingly, in order to facilitate calculation of the characteristic extraction matrix $A^T$ in a latter step, class structure constructing section 1701 transforms the coordinate system (space) into a coordinate system such that the total covariance matrix $C_T$ is a unit matrix. Specifically, using a matrix U indicated in equation 8, class structure constructing section 1701 transforms the coordinate system (space) into the coordinate system such that the total covariance matrix $C_T$ is a unit matrix (S1803).

[Eq.8]

$$\tilde{C}_T = U^T C_T U = I \quad (8)$$

U:TRANSFORMATION MATRIX
I:UNIT MATRIX

Next, class structure constructing section 1701 obtains a class structure that minimizes the within-class variance in the coordinate system transformed with the matrix U, by the ISODATA method (S1804). Then, based on the obtained class structure, class structure constructing section 1701 generates class-structure model data database 116 (S1805).

Since the total covariance matrix $C_T$ is constant, as can be seen from equation 7, obtaining the class structure that minimizes the within-class variance is equal to obtaining a class structure that maximizes discrimination standard $J_1$.

Figure 13:
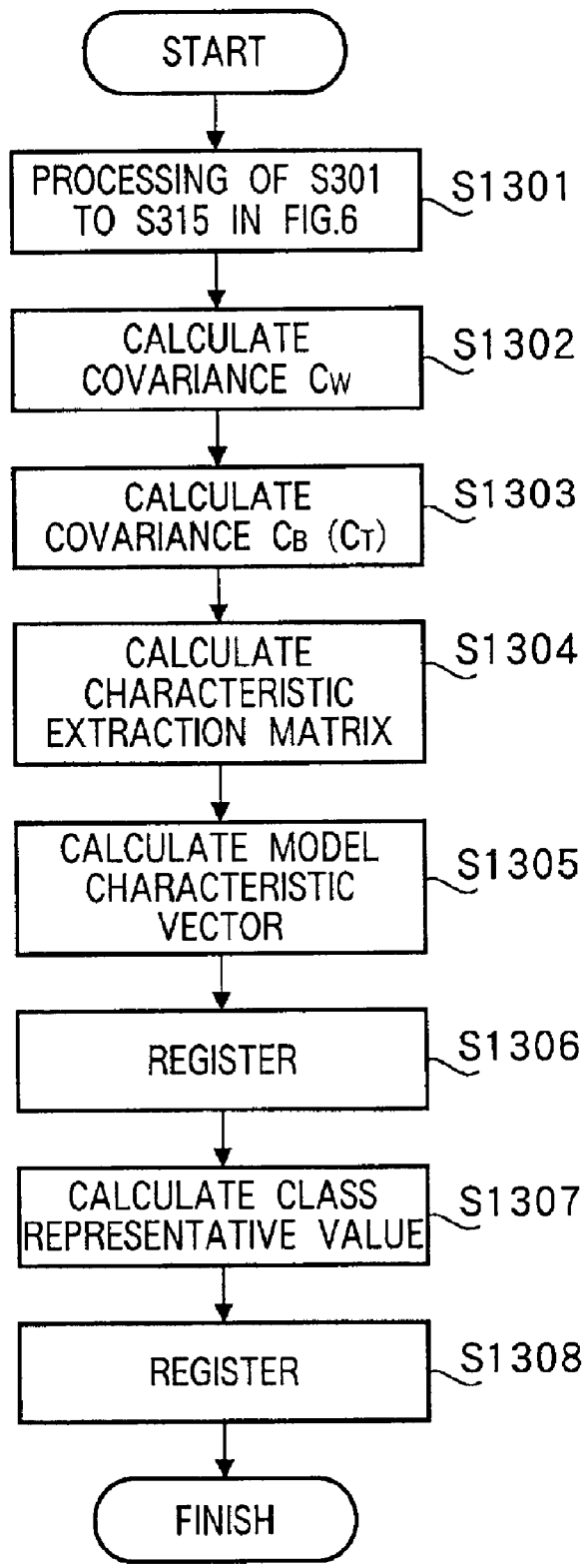
FIG. 13 is an operation flowchart for the offline processing in the data classifying apparatus according to the second embodiment.

Thereafter, based on obtained class-structure model data database 116, class structure constructing section 1701 performs the processing of S1302 to S1308 in FIG. 13 in the same way as in the second embodiment, and calculates a characteristic extraction function enabling class recognition with accuracy (S1806). Then, data classifying apparatus 1700 finishes the offline processing.

As described above, according to the third embodiment, by using the ISODATA method in reconstructing class-structure model data database 116 from category-structure model data database 115, it is possible to classify model data items into classes so that the within-class variance is decreased, by the calculation without user operation. Further, by thus classifying model data items into classes so that the within-class variance is decreased, characteristics of classes can be clarified.

According to the third embodiment, it is possible to calculate the characteristic extraction matrix $A^T$ by obtaining a matrix for transforming a coordinate system so as to maximize the variance ratio $J_1$ that is a radio of the total covariance matrix $C_T$ of all the model data groups to the within-class covariance matrix $C_W$. Since the coordinate system that maximizes the variance ratio $J_1$ is a coordinate system such that the total covariance matrix $C_T$ is large which the within-class covariance matrix $C_W$ is small, the characteristic extraction matrix $A^T$ can be obtained by obtaining a matrix for transforming a coordinate system so that the variance ratio $J_1$ is maximized. Thus, it is possible to obtain the characteristic extraction matrix $A^T$ easily by calculation.

Further, according to the third embodiment, it is possible to perform the class classification after transforming a coordinate system so that the total covariance matrix $C_T$ of all the model data becomes a unit matrix. It is thereby possible to obtain the characteristic extraction matrix easily in the case where the characteristic extraction matrix is obtained using the total covariance matrix $C_T$ of all the model data groups, like the third embodiment.

In addition, in the third embodiment the characteristic extraction matrix is obtained which transforms a coordinate system so that the total covariance matrix $C_T$ is large while the within-class covariance matrix $C_W$ is small. However, it may be possible to use as a characteristic extraction matrix a matrix for transforming a coordinate system so that the total covariance matrix $C_T$ is large. Also by using such a characteristic extraction matrix, it may be possible to transform a coordinate system into a coordinate system that clarifies class characteristics.

As described above, according to the present invention, a class with the highest degree of similarity with input image data is detected, a category to which the detected class belongs is obtained, and thus the category of the input data is obtained. It is thereby possible to classify input data to a proper category regardless of distribution of category.

The present invention is not limited to the above described embodiments, and various variations and modifications may be possible without departing from the scope of the present invention.

This application is based on the Japanese Patent Application No. 2001-026439 filed on Feb. 2, 2001 and the Japanese Patent Application No.2002-13337 filed on Jan. 22, 2002, entire content of which is expressly incorporated by reference herein.

What is claimed is:

1. A data classifying apparatus comprising:
   a class constructor that classifies model data groups, each comprising a plurality of model data and represented in a vector format, into classes on a per category basis, said classes comprising smaller vector distributions than categories required by an application, each class representing characteristics in more detail than said categories;
   a representative value calculator that calculates a representative value of each class using the model data classified in each respective class;
   a class determiner that compares input data to the representative values, and determines a class having the representative value most similar to the input data; and
   a category determiner that determines a category to which the input data belongs from the determined class.

2. The apparatus according to claim 1, wherein the distribution of each class does not belong to a plurality of categories.

3. The apparatus according to claim 1, further comprising:
   a matrix calculator that calculates a characteristic extraction matrix that transforms a coordinate system so as to clarify characteristics of each class, wherein the category determiner compares the input data with representative values transformed by the characteristic extraction matrix and thereby determines the class having the representative value most similar to the input data.

4. The apparatus according to claim 1, wherein the class constructor classifies the model data groups into classes so as to minimize variances within the classes.

5. The apparatus according to claim 1, wherein the data classifying apparatus generates, from the model data, a model pattern vector expressed as a one dimensional vector representative of pixel values and generates, from the input data an input pattern vector expressed as a one dimensional vector representative of pixel values.

6. The apparatus according to claim 2, wherein when the category determiner determines that the input data belongs to a plurality of categories, the class constructor adds a new item to the predetermined item, and classifies the classes according to the new item, thereby preventing a distribution of any of the classes from belonging to a plurality of categories.

7. The apparatus according to claim 3, wherein the matrix calculator calculates the characteristic extraction matrix so as to decrease a variance of each of the model data groups within each of the classes.

8. The apparatus according to claim 3, wherein the matrix calculator transforms the characteristic extraction so as to increase a variance of the classes between the classes.

9. The apparatus according to claim 3, wherein the matrix calculator calculates the characteristic extraction matrix so as to decrease a variance of each of the model data groups within each of the classes, while increasing a variance of the classes between the classes.

10. The apparatus according to claim 9, wherein the matrix calculator calculates the characteristic extraction matrix so as to maximize a variance ratio of a between-class covariance matrix of the classes to a within-class covariance matrix of the model data groups contained in the classes.

11. The apparatus according to claim 9, wherein the matrix calculator calculates the characteristic extraction matrix so as to maximize a variance ratio of a covariance matrix of the model data groups to a within-class covariance matrix of the model data groups contained in the classes.

12. The apparatus according to claim 11, wherein the class constructor transforms the coordinate system such that covariance matrices of the model data groups are unit matrices.

13. A material recognizing apparatus, comprising:
    the data classifying apparatus according to claim 1;
    wherein the category comprises a type of material, the model data is classified according to a type, and the type of the input data is determined.

14. A material recognizing apparatus, comprising:
    the data classifying apparatus according to claim 1;
    wherein the category comprises a distance to a material, the model data is classified according to a distance to the material, and the distance to the material of the input data is determined.

15. A data classifying method, comprising:
    classifying model data groups, each comprising a plurality of model data and represented in a vector format, into classes on a per category basis, the classes comprising smaller vector distribution than categories required by an application, each class representing characteristics in more detail than the categories;
    calculating a representative value of each class using the model data classified in each respective class;
    comparing input data to the representative values;
    determining a class having the representative value most similar to the input data; and
    determining a category to which the input data belongs from the determined class.

16. A program executable by a computer, comprising:
    classifying model data groups, each comprising a plurality of model data and represented in a vector format, into classes on a per category basis, the classes comprising smaller vector distribution than categories required by an application, each class representing characteristics in more detail than the categories;
    calculating a representative value of each class using the model data classified in each respective class;
    comparing input data to the representative values;
    determining a class having the representative value most similar to the input data; and
    determining a category to which the input data belongs from the determined class.

* * * * *